(12) United States Patent
Miyamoto et al.

(10) Patent No.: US 6,456,391 B1
(45) Date of Patent: Sep. 24, 2002

(54) PRINTER AND PRINTING METHOD

(75) Inventors: Yusuke Miyamoto; Izumi Miyake, both of Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/352,776

(22) Filed: Jul. 14, 1999

(30) Foreign Application Priority Data

Jul. 17, 1998 (JP) .......................................... 10-203257

(51) Int. Cl.⁷ .............................................. G06K 15/00
(52) U.S. Cl. ........................................ 358/1.18; 358/1.1
(58) Field of Search ....................... 358/1.1, 1.6, 1.13, 358/1.12, 1.15, 1.18; 355/27, 28, 29, 39, 40, 41, 77, 38

(56) References Cited

U.S. PATENT DOCUMENTS 5,907,391 A * 5/1999 Kobayashi et al. ........... 355/40

FOREIGN PATENT DOCUMENTS

JP          7-298176       11/1995    ............ H04N/5/76

* cited by examiner

*Primary Examiner*—Arthur G. Evans
(74) *Attorney, Agent, or Firm*—Sughrue Mion, PLLC

(57) ABSTRACT

The printer receives image data representing multiple images from a storage medium and produces an index print, on which thumbnail pictures representing the images are arranged in the form of a matrix. While looking at the index print, a user selects a desired picture and puts a mark on the index print with a pen, etc. at a position corresponding to the selected picture. The marked index print is inserted into the printer through a paper feeding inlet, and photo-reflectors detect the position of the mark while the index print is transported by means of a transport system, which is also used during the printing. The picture selected by the user is determined with the detected position of the mark, and the image corresponding to the selected picture is printed in a full-size.

13 Claims, 6 Drawing Sheets

PRINTER AND PRINTING METHOD

BACKGROUND OF THE INVENTION

1. Field of the Invention

The present invention relates generally to a printer, and more particularly to a printer that receives image data from an image data source such as a storage medium containing the image data and a digital still camera and that prints an image selected by a user from the received image data on a medium such as printing paper.

2. Description of Related Art

A monitor for displaying an image to be printed is conventionally required in a printer that is provided with a video signal receiving part and/or an input interface for connecting with an imaging apparatus such as a digital still camera. However, if the printer receives image data from a portable image data source such as the digital still camera and a portable external storage medium such as a PC card, the printing is preferably performed only by the image data source and the printer (i.e., without an external monitor). To eliminate the necessity of providing the external monitor for displaying the image during printing, there has already been proposed a method in which a liquid crystal display (LCD) is attached to the printer and an image is selected by operating a touch panel on the LCD (Japanese Patent Provisional Publication No. 7-298176).

In this method, however, the printer is relatively expensive since it is provided with the LCD and the touch panel as the interface with the user.

SUMMARY OF THE INVENTION

In view of the foregoing, it is an object of the present invention to provide a printing method and a printer, which make it possible to receive instructions and designations from a user without a means that increases the cost such as a touch panel and an LCD, and confirm the printings without the use of a monitor when a desired image is selected from an image data source to be printed.

To achieve the above-mentioned object, the present invention is directed to a printing method, comprising the steps of: receiving image data representing a plurality of images from an image data source; producing an index print on which a plurality of pictures corresponding to the plurality of images are printed; selecting a picture from the plurality of pictures printed on the index print and putting a mark on the index print to designate the selected picture; inserting the index print with the mark into an index print receiving part; transporting the index print inserted in the index print receiving part by a transporting part and reading the mark by a mark detector; and printing, on printing paper, an image corresponding to the mark read by the mark detector.

According to the present invention, the index print is produced according to the image data received from the image data source in order to show the user all the images received from the image data source. While looking at the index print, the user selects at least one image to be printed and puts at least one mark on the index print according to the selection. The marked index print serves as an information entry sheet for transmitting information relating the selection to the printer. More specifically, when the marked index print is inserted into the printer through the index print receiving part, the transporting part transports the index print to the mark detector, which reads the mark. The image selected by the user is determined with the read mark, and the image is printed on the printing paper in a full-size for example.

In this method, it is possible to selectively print only the desired image, which is selected by the user, among multiple pieces of image data without using the image display apparatus such as the monitor.

The present invention is directed to a printer, comprising: an image data receiving part for receiving image data representing a plurality of images from an image data source; an index print receiving part for receiving an index print on which a plurality of pictures corresponding to the plurality of images are printed; a transporting part for transporting the index print received by the index print receiving part; a mark detector for detecting a mark put on the index print transported by the transporting part; and a printing part for printing, on printing paper, an image corresponding to the mark detected by the mark detector.

Another printer may produce the index print in advance, but more preferably, the printer of the present invention further comprising an index print producing part for producing the index print according to the image data received by the image data receiving part.

It is also preferable that the transporting part is also used to transport the printing paper at printing. This would simplify the hardware structure of the printer.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
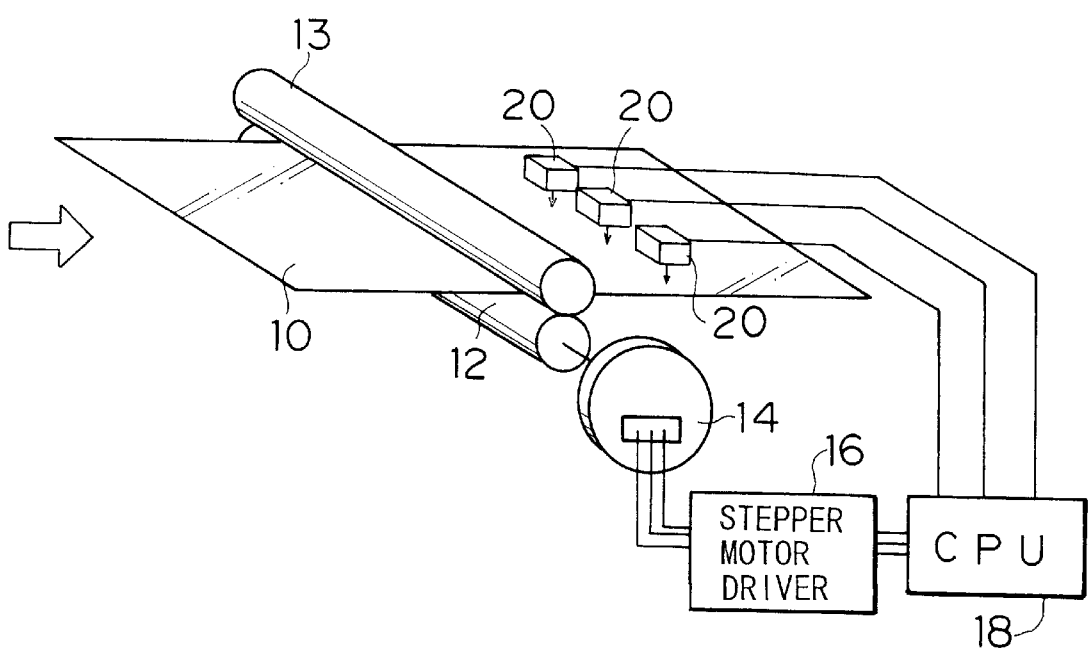
FIG. 1 is a schematic view showing the essential parts of a printer according to a preferred embodiment of the present invention.

FIG. 1 is a schematic view showing the essential parts of a printer according to a preferred embodiment of the present invention. In FIG. 1, reference numeral 10 is a piece of printing paper, 12 is a capstan roller for transporting the printing paper 10, 13 is a pinch roller, 14 is a stepper motor, 16 is a stepper motor driver, 18 is a central processing unit (CPU), and 20 is a mark detector or a photo-reflector.

The capstan roller 12 connects to the stepper motor 14 through a transmission mechanism such as a gear train (not shown). The CPU 18 controls the stepper motor driver 16 for driving the stepper motor 14. The stepper motor 14 is driven by drive pulses applied from the stepper motor driver 16. The rotational driving force of the stepper motor 14 is transmitted to the capstan roller 12 through the transmission mechanism to thereby rotate the capstan roller 12.

The printing paper 10 is pinched between the capstan roller 12 and the pinch roller 13, which are oppositely arranged in a vertical direction. The rotational force of the capstan roller 12 transports the printing paper 10 horizontally in FIG. 1. Several photo-reflectors 20 (three in FIG. 1) are arranged in a row perpendicularly to the transport direction of the printing paper 10. The photo-reflectors 20 are photo-sensors that receive light reflected from the printing paper 10. The photo-reflectors 20 are used to detect a mark 57 (see FIG. 5) on the printing paper 10, and they can also be used as an end detecting means for detecting the arrival of the end of the printing paper 10 being fed. A detection signal is transmitted from each photo-reflector 20 to the CPU 18.

Small pictures (so-called thumbnail pictures), which correspond to all the images stored in a storage medium such as a memory card, are arranged and printed in the form of a matrix on the printing paper 10. The printing paper 10 on which the thumbnail pictures are printed is called an index print. The user can confirm all the images stored in the storage medium with the index print. The user selects at least one picture corresponding to at least one image to be printed in a full-size, and puts the mark 57 on the index print to designate the selected picture with a pen, or the like. The mode of the mark will be described in detail later.

The photo-reflectors 20 detect the mark 57 put by the user, so that the printer can automatically recognize the picture designated by the user. The number of photo-reflectors 20 should be determined according to possible positions of marks to be detected, thus the maximum matrix size in the index printing should be considered.

The photo-reflectors 20 scan the surface of the printing paper 10 to detect the presence of the mark 57 while the capstan roller 12 transports the printing paper 10 that is the index print. It is therefore possible to find the position of the mark 57 on the printing paper 10 in the direction perpendicular to the transport direction. During the transportation of the printing paper 10 (the index print), the photo-reflectors 20 detect the passage of the end of the printing paper 10, and the CPU 18 counts the number of steps in which the printing paper 10 have been transported by the stepper motor 14, thereby recognizing the transported amount of the printing paper 10 and finding the position of the mark 57 in the transport direction.

A line sensor may be used instead of the photo-reflectors 20 in FIG. 1, or a movable detecting means may be used, instead of the photo-reflectors 20, to detect the mark while it moves to scan the printing paper 10.

Figure 2:
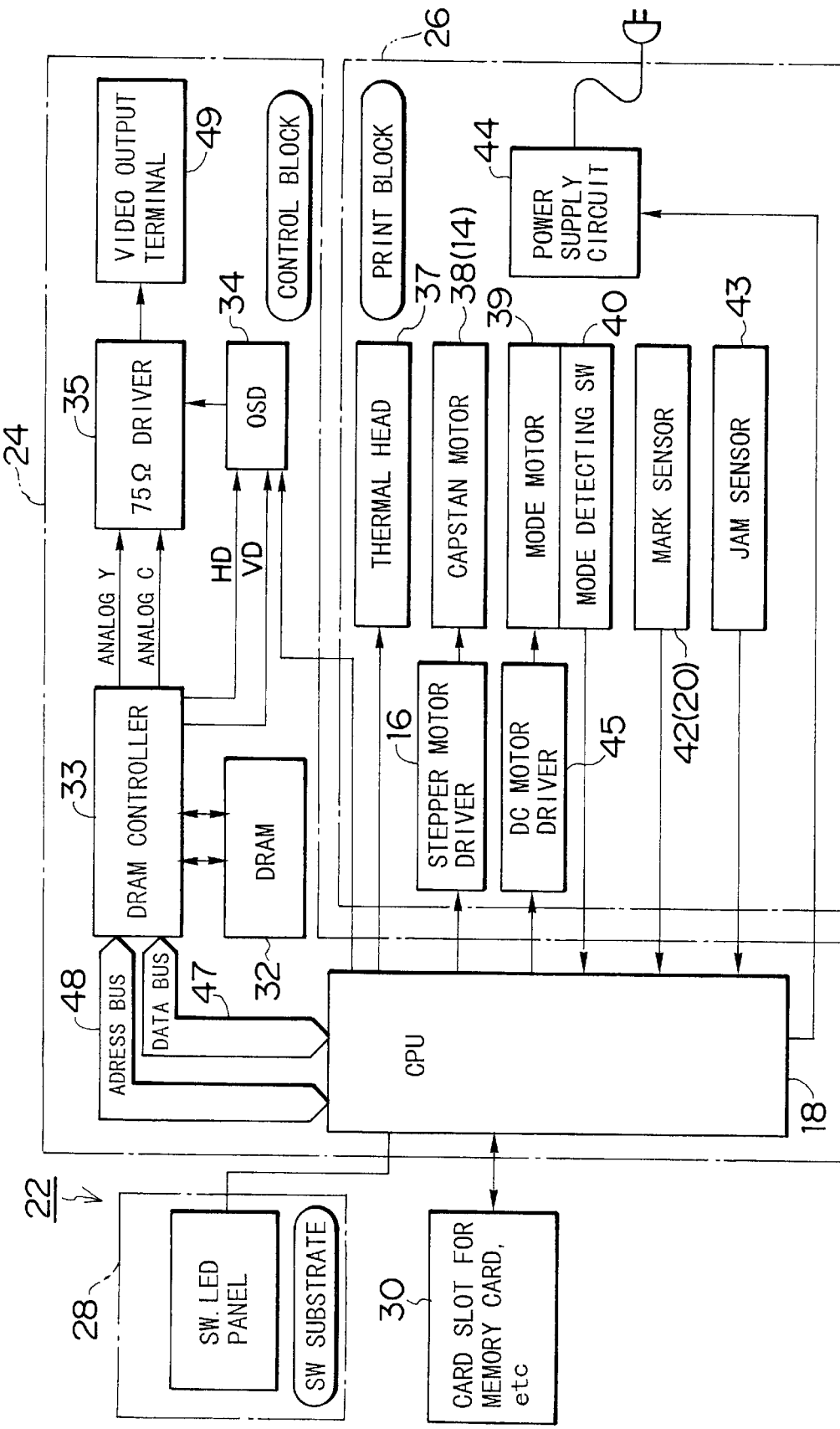
FIG. 2 is a block diagram showing the structure of the printer according to the preferred embodiment of the present invention.

FIG. 2 is a block diagram of the printer according to a preferred embodiment of the present invention. The printer 22 of the present invention is an auto-thermochrome (TA) type digital printer. The printer 22 comprises a control block 24, a print block 26, a switch substrate 28 and an image data receiving part or a card slot 30 into which the storage medium such as the memory card is inserted.

The control block 24 includes the CPU 18, a DRAM 32, a DRAM controller 33, a letter superimposing (On Screen Display) IC 34, and a 75Ω driver 35 for driving a television monitor (not shown).

The print block 26 includes a thermal head 37 for applying thermal energy to the printing paper 10 to develop colors; a capstan motor 38, which is equivalent to the stepper motor 14 in FIG. 1, for providing power to transport the printing paper 10; a mode motor 39 for supplying power to a switching means for switching a variety of settings in association with the printer mode switching operation; a mode detector or a mode detecting switch 40 for detecting a mode set by the mode motor 39; a mark sensor 42, which is equivalent to the photo-reflectors 20 in FIG. 1; a jam sensor 43; and a power supply circuit 44.

As described with reference to FIG. 1, the stepper motor is used as the capstan motor 38, which is driven by the stepper motor driver 16 controlled by the CPU 18. On the other hand, a DC motor is used as the mode motor 39, which is driven by a DC motor driver 45 controlled by the CPU 18.

Although the structure of the switch substrate 28 is not illustrated in detail, the switch substrate 28 includes a variety of switch means such as a print button for commanding the printer to start printing, and an index print feed button for commanding to read the mark on the index print; and an LED display part for displaying the presence of the mark on the index print and the state of the operation of the printer in a predetermined lighting color and/or at a predetermined blinking cycle.

The storage medium as an image data source is, for example, a SMART medium, a PC card, a flash memory card, an IC card, a floppy disk, and a magnetic-optical disk (MO). The card slot 30 is designed according to the storage medium to be used.

When the storage medium containing multiple pieces of electronic image data is inserted into the card slot 30, the CPU 18 reads the contents of the card. The image data read from the card is supplied to the DRAM controller 33 through busses 47, 48. Then, the image data is stored in the DRAM 32 through the DRAM controller 33.

Then, a predetermined signal processing is performed for the image data under the control of the CPU 18 to thereby generate printing data, and analog luminance signal (Y signal) and analog color difference signal (C signal) for outputting an image on the monitor.

The Y signal and the C signal are supplied to the 75Ω driver 35 from the DRAM controller 33, and they are outputted from the 75Ω driver 35 to the outside through a video output terminal 49. The DRAM controller 33 supplies horizontal synchronous signals (HD) and vertical synchronous signals (VD) to the letter superimposing IC 34. The letter superimposing IC 34 can superimpose letter information on the image on the monitor.

The CPU 18 controls the thermal energy of the thermal head 37 in accordance with the printing data, and sequentially develops yellow (Y), magenta (M) and cyan (C) developing layers of the printing paper 10. The printing method using the TA-type printer is well known, and it will not be described here.

A description will now be given of the operation of the printer, which is constructed in the above-mentioned manner.

Figure 3:
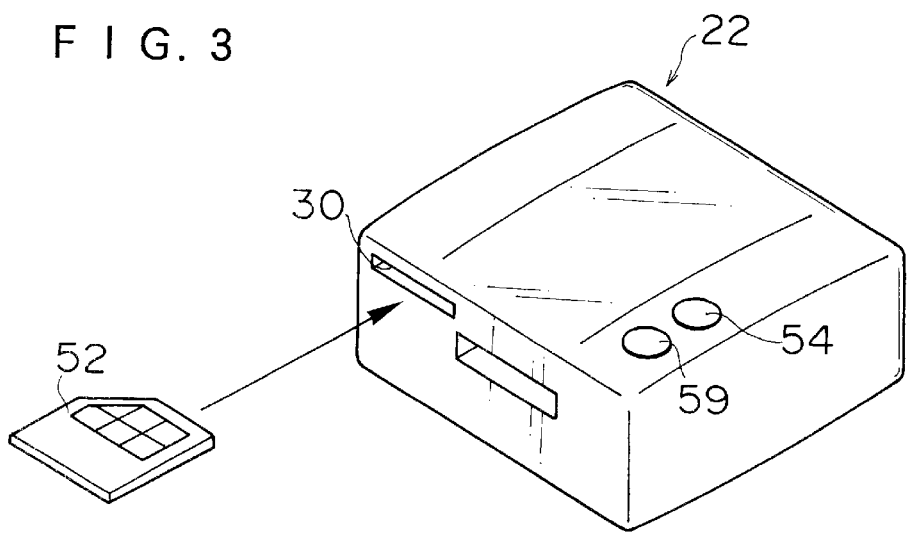
FIG. 3 is a view of assistance in explaining the method for using the printer according to the preferred embodiment of the present invention.
Figure 4:
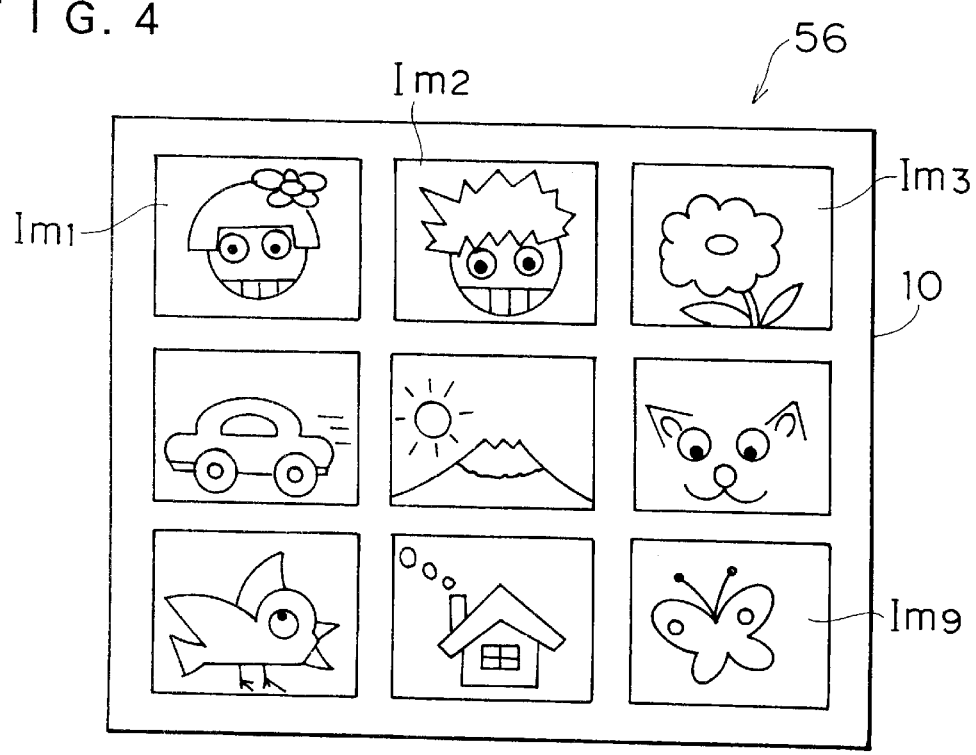
FIG. 4 is a view showing an example of an index print.

First, a description will be given of a method for using the printer according to the above-described embodiment with reference to FIGS. 3–7. When the memory card 52 containing the electronic image data is inserted into the card slot 30 of the printer 22 as shown in FIG. 3 and the print button 54 is pressed, all the image data stored in the memory card 52 are read to produce the index print 56 shown in FIG. 4. FIG. 4 shows the index print 56, in which nine thumbnail pictures $Im_k$ (k=1, 2, 3, ..., 9) are arranged in the matrix of 3 rows by 3 columns on a sheet of the printing paper 10. The number and arrangement of a thumbnail pictures, however, should not be restricted to this.

Figure 5:
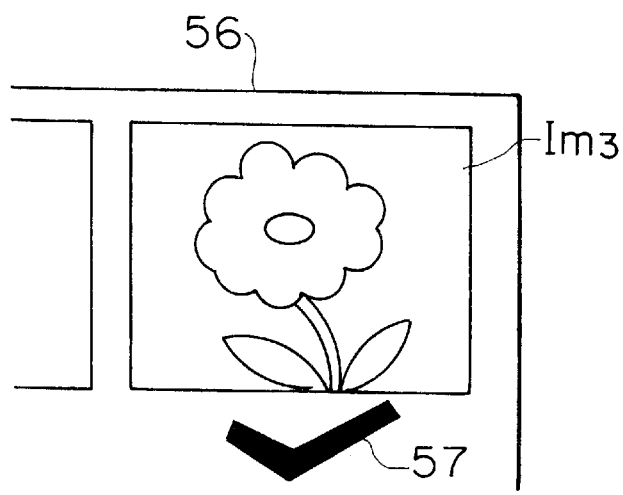
FIG. 5 is a view showing an example of a mark put on the index print.

The user selects at least one thumbnail picture corresponding to at least one image that is desired to be printed in a full-size, in which one image is printed on the entire printing paper in a predetermined size, from the plurality of thumbnail pictures printed on the index print 56, and puts the mark to the selected thumbnail picture. For example, if the user selects a thumbnail picture $Im_3$ at the upper right corner in FIG. 4, he or she writes a check mark 57 with a black pen, or the like in a blank below the selected thumbnail picture as shown in FIG. 5. Alternatively, it is possible to paint over a marking frame (a check box) in the blank with a pen, or the like. It is also possible to put a seal or a label such as a barcode on the blank, and to punch in the blank. In addition, it is possible to designate the number of prints by marking the number of prints in a column, or by painting over the corresponding number of check boxes. Furthermore, it is possible to order the printer to perform a special print such as a monochrome print, a sepia-tone print, or the like by marking on the index print.

Figure 6:
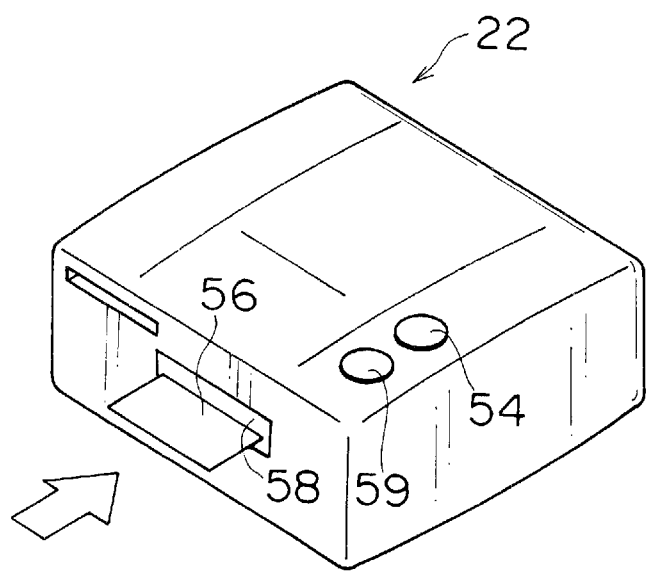
FIG. 6 is a perspective view showing the state wherein a marked index print is inserted into the printer.

The index print 56 that has been marked in a predetermined way is inserted into an index print receiving part or a paper feeding inlet 58 of the printer 22 as shown in FIG. 6, and the index print feeding button 59 is pressed. Then, the index print 56 is fed to the photo-reflectors 20 by means of the transport system (the capstan roller 12 and the pinch roller 13) as described with reference to FIG. 1. The photo-reflectors 20, which are arranged in the row in the direction perpendicular to the paper transport direction, scans the printed surface of the index print 56 to detect the mark thereon put by the user.

Preferably, the paper feeding inlet 58 for the index print 56 is also used as a paper feeding inlet into which raw printing paper (on which no picture has been printed yet) is inserted, but two paper feeding inlets may be provided separately. A paper discharge outlet for discharging printed paper may be used as the paper feeding inlet 58 for receiving the index print 56.

Figure 7:
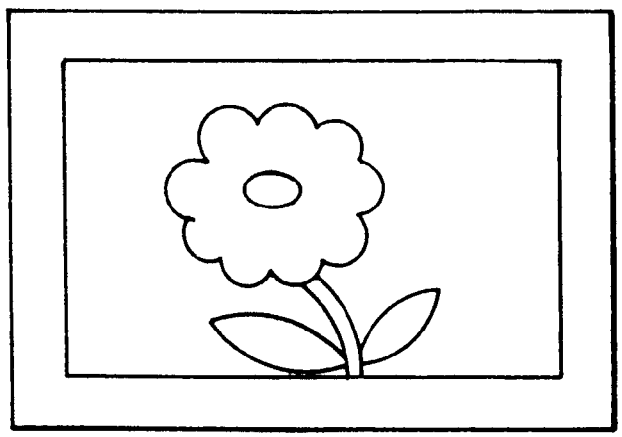
FIG. 7 is a view showing an example of a full-size print.

Thereafter, an LED lamp (not shown) is turned on to let the user know that the mark has already been detected. Then, the print button 54 is pressed to discharge the index print 56. A new sheet of printing paper is supplied to the printing part so that the image ($Im_3$ in this case), corresponding to the position of the mark put by the user, can be printed in the full-size as shown in FIG. 7.

Figure 8:
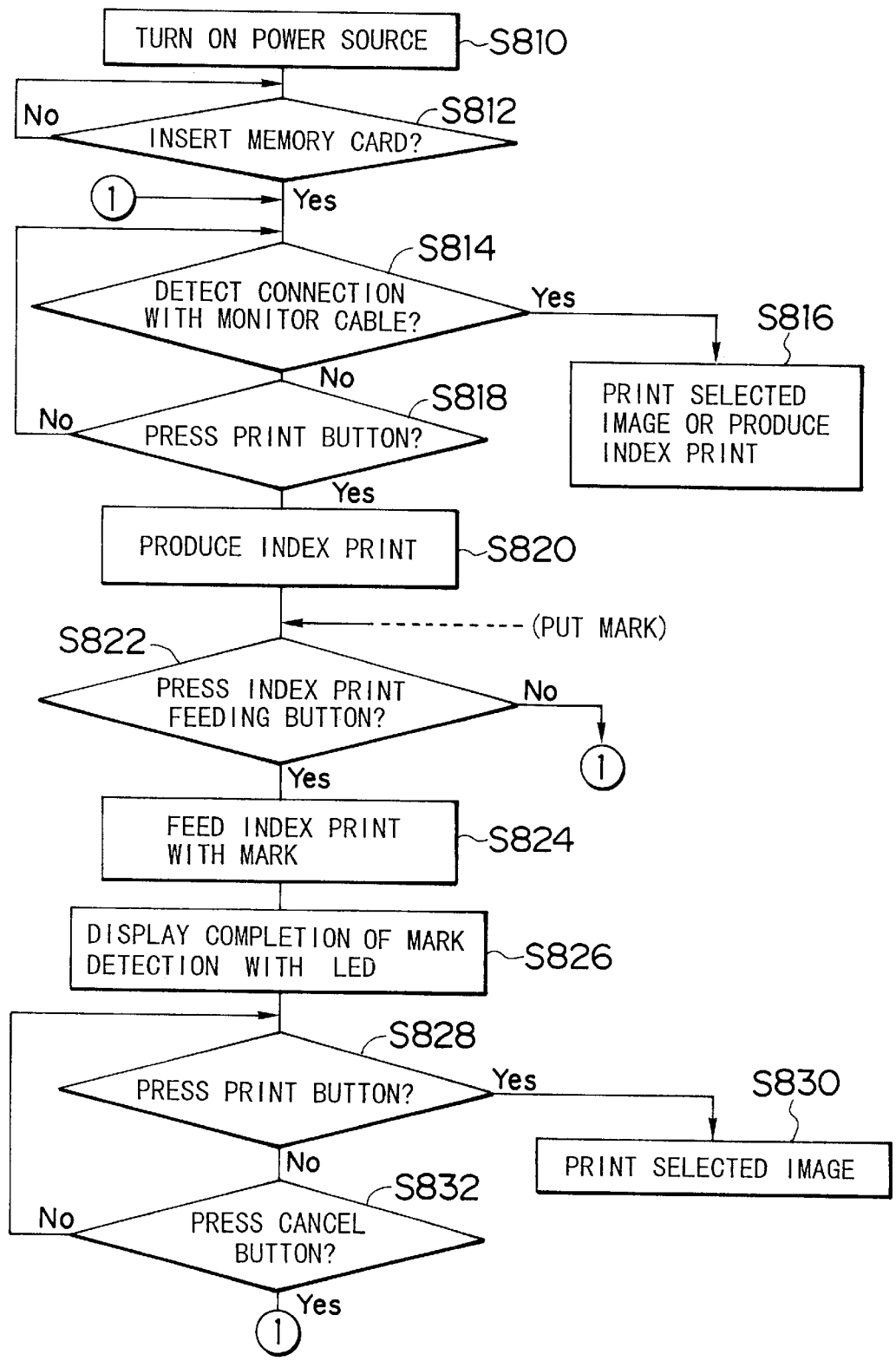
FIG. 8 is a flow chart showing the processing procedure of the printer according to the preferred embodiment of the present invention.

FIG. 8 is a flow chart showing the processing procedure of the printer according to the preferred embodiment. After turning on the power source of the printer 22 (S810), the user inserts the storage medium such as the memory card 52 into the card slot 30 of the printer 22 (S812). If the storage medium as the image data source has been inserted into the card slot 30, the CPU 18 determines whether the printer 22 connects to an external image display apparatus such as the television monitor through the video output terminal 49 (S814). Although not illustrated, the video output terminal 49 is provided with a connection detecting means for detecting the connection with a monitor cable, through which the printer 22 is connected to the external image display apparatus. The connection detecting means transmits a detection signal to the CPU 18.

If the printer 22 connects to the external image display apparatus, the user can select an image to be printed and can instruct the printer to print the selected image while looking at images displayed on the external monitor. Thus, when the connection detecting means detects the connection with the monitor cable, the printer 22 accepts either the instruction to print the selected image in the full-size or the instruction to produce the index print, so that the printer prints the image selected by the user (S816).

On the other hand, when the connection detecting means does not detect the connection with the monitor cable at S814, it is impossible to display the image on the monitor. Thus, the image is confirmed with reference to the index print 56. More specifically, when the user presses the print button 54 (S818), the index print 56 is always produced first (S820). The user marks, in a predetermined way, at least one picture on the index print 56, which is discharged from the printer 22, corresponding to the image that is desired to be printed in the full-size.

Then, the user inserts the index print 56 with the mark(s) into the paper feeding inlet 58 and presses the index print feeding button 59 (S822). If the index print feeding button 59 is not pressed in a predetermined period, the processing is cancelled and returns to S814.

When the index print feeding button 59 is pressed, the CPU 18 of the printer 22 drives the capstan motor 38 (the stepper motor 14) of the transport system to transport the index print 56 to the photo-reflectors 20 (S824). Consequently, the mark on the index print 56 is detected to determine the picture designated by the user.

When the detection of the mark is completed, the information to that effect is displayed with the LED on the control panel (S826). When the user presses the print button 54 (S828), the designated image is printed in the full-size (S830).

On the other hand, if the user presses a cancel button (not shown) without pressing the print button 54 (S832), the information of the mark detection is cancelled, so that the printer waits for an instruction to print the index print (S814).

In this case, if no index print is printed after the power source is turned on, it is impossible to print the image in the full-size.

As described above, upon receipt of the image data from the image data source, the printer produces the index print representing all the images. The user designates the desired image(s) while looking at the index print. This eliminates the necessity of providing a display apparatus such as the external monitor and the LCD for displaying the images.

Moreover, the image can be designated easily and securely by putting the mark on the index print, and the marked index print is transported to the mark detector by means of the transport system that is also used for printing. Therefore, the position of the mark can be determined with the simple structure.

In this embodiment, the printer receives multiple pieces of image data from the storage medium, but the printer may receive the image data from external equipment such as a digital camera and a personal computer through a communication means. In this case, an index print representing all the received images is produced, an image to be printed in the full-size is marked on the index print, and the marked image is determined by reading the mark put on the index print.

The TA printer is used in this embodiment, but the present invention may be applied to a variety of printers such as a melting type thermal transfer printer, an ink-jetting printer and a sublimation type thermal transfer printer.

As set forth hereinabove, according to the printing method of the present invention, the index print is produced according to the image data inputted from the image data source. The selected image to be printed is marked on the index print, and the marked index print is inserted into the paper feeding inlet so that the mark is read. Then, the image corresponding to the mark put by the user is printed. It is therefore possible to print the desired image among multiple pieces of image data while looking at the images on the index print without using the image display apparatus such as the monitor.

According to the printer in this printing method, it is possible to receive the instructions and designations from the user and to print the image confirmed by the user without using a touch panel or an LCD. Therefore, it is possible to realize a printer that can selectively print a desired image easily at a low cost.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A printing method, comprising the steps of:
   receiving image data representing a plurality of images from an image data source;
   producing an index print on which a plurality of pictures corresponding to the plurality of images are printed;
   selecting a picture from the plurality of pictures printed on the index print and putting a mark on the index print to designate the selected picture;
   inserting the index print with the mark into an index print receiving part;
   reading the mark on the index print inserted in the index print receiving part using a mark detector; and
   printing, on printing paper, an image corresponding to the mark read by the mark detector.

2. A printer, comprising:
   an image data receiving part for receiving image data representing a plurality of images from an image data source;
   an index print receiving part for receiving an index print on which a plurality of images are printed;
   a mark detector for detecting a mark put on the index print received by the index print receiving part; and
   a printing part for printing, on printing paper, an image corresponding to the mark detected by the mark detector.

3. The printer as defined in claim 2, further comprising an index print producing part for producing the index print according to the image data received by the image data receiving part.

4. The printer as defined in claim 2, further comprising a transporting part for transporting the index print to the mark detector for detecting the mark put on the index print and transporting the printing paper at printing.

5. The printing method as defined in claim 1, wherein the step of reading the mark includes transporting the index print inserted in the index print receiving part by a transporting part.

6. The printing method as defined in claim 1, wherein the pictures printed on the index print comprise thumbnail pictures, and the mark put on the index print to designate the selected picture comprises an ink mark, a seal, a label or a punched hole.

7. The printing method as defined in claim 1, wherein the mark designates the number of prints of the selected picture to be printed.

8. The printing method as defined in claim 1, wherein the mark indicates print format instructions for the selected picture to be printed.

9. The printer as defined in claim 2, wherein the mark detector comprises a plurality of photo-reflectors.

10. The printer as defined in claim 2, wherein the pictures printed on the index print comprise thumbnail pictures, and the mark put on the index print comprises an ink mark, a seal, a label or a punched hole.

11. The printer as defined in claim 2, wherein the mark designates a number of times a selected picture on the index print is to be printed, and the printing part prints the image the number of times designated by the mark detected by the mark detector.

12. The printer as defined in claim 2, wherein the mark indicates print format instructions for a selected picture on the index print to be printed, and the printing part prints the image in accordance with the print format instructions indicated by the mark detected by the mark detector.

13. The printer as defined in claim 2, further comprising a transporting part for transporting the index print received by the index print receiving part, wherein the mark detector detects the mark put on the index print while the index print is transported by the transporting part.

* * * * *